United States Patent [19]

Schorfheide et al.

[11] Patent Number: 5,391,292
[45] Date of Patent: Feb. 21, 1995

[54] CYCLIC REFORMING CATALYST REGENERATION

[75] Inventors: James J. Schorfheide; Albert E. Schweizer, both of Baton Rouge, La.

[73] Assignee: Exxon Research and Engineering Company, Florham Park, N.J.

[21] Appl. No.: 169,447

[22] Filed: Dec. 17, 1993

[51] Int. Cl.$^6$ .............. C10G 35/22; C10G 35/085; B01J 23/96; B01J 38/18
[52] U.S. Cl. .............. 208/140; 208/138; 208/139; 502/37; 502/38; 502/50; 502/53
[58] Field of Search .......... 208/140, 139, 138; 502/50, 53, 38, 37

[56] References Cited

U.S. PATENT DOCUMENTS

| | | | |
|---|---|---|---|
| 2,944,008 | 7/1960 | Hakton et al. | 502/50 |
| 3,438,888 | 4/1969 | Spurlock | 208/138 |
| 3,507,781 | 4/1970 | Spurlock et al. | 208/138 |
| 4,148,758 | 4/1979 | Eberly, Jr. | 208/139 |
| 4,261,810 | 4/1981 | McHale | 208/139 |
| 4,769,128 | 9/1988 | Boyle | 208/140 |
| 5,137,620 | 8/1992 | Robbins et al. | 208/139 |

*Primary Examiner*—Paul E. Konopka
*Attorney, Agent, or Firm*—Henry E. Naylor

[57] ABSTRACT

Disclosed is a method for starting up a cyclic or semi-cyclic reforming reactor after catalyst regeneration. The method mitigates disruptions to the reforming unit after catalyst regeneration, such as excessive light gas make and a decrease in recycle hydrogen purity.

10 Claims, No Drawings

CYCLIC REFORMING CATALYST REGENERATION

FIELD OF INVENTION

The present invention relates to a method for starting up a cyclic or semi-cyclic reforming reactor after catalyst regeneration. The method mitigates disruptions to the reforming unit after catalyst regeneration, such as excessive light gas make and a decrease in recycle hydrogen purity.

BACKGROUND OF THE INVENTION

Catalytic reforming is a well established industrial process employed by the petroleum industry for improving the octane quality of naphthas and straight run gasolines. In reforming, a multi-functional catalyst is employed which contains a metal hydrogenation-dehydrogenation (hydrogen transfer) component, or components, substantially atomically dispersed upon the surface of a porous, inorganic oxide support, notably alumina. Noble metal catalysts, notably of the platinum type, are currently employed. Reforming can be defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and cracking reactions which produce gas. Many of these reactions also result in coke being deposited on the catalyst.

In a reforming operation, one or a series of reactors, providing a series of reaction zones, are employed. Typically, a series of reactors are employed, e.g., three or four reactors, these constituting the heart of the reforming unit. Each reforming reactor is generally provided with a fixed bed, or beds, of catalyst, typically a platinum-containing catalyst or a platinum/promoter metal catalyst, which receive downflow feed. Each reactor is provided with a preheater, or interstage heater, because the net effect of the reactions which take place is typically endothermic. A naphtha feed, with hydrogen, and/or hydrogen-containing recycle gas, is passed through the preheat furnace then to the reactor, and then in sequence through subsequent interstage heaters and reactors of the series. The product from the last reactor is separated into a liquid fraction and a vaporous fraction, the former usually being recovered as a $C_5+$ liquid product. The latter is rich in hydrogen, usually contains small amounts of normally gaseous hydrocarbons, and is recycled to the process to minimize coke production.

The sum total of the reforming reactions occurs as a continuum between the first and last reactor of the series, i.e., as the feed enters and passes over the first fixed catalyst bed of the first reactor and exits from the last fixed catalyst bed of the last reactor of the series. During an on-oil run, the activity of the catalyst gradually declines due to build-up of coke on the catalyst. During operation, the temperature of the process is gradually raised to compensate for the activity loss caused by coke deposition. Eventually, however, economics dictate the necessity of reactivating the catalyst. Consequently, in all processing of this type, the catalyst must necessarily be periodically regenerated by burning off the coke at controlled conditions.

Several major types of reforming are practiced in multi-reactor reforming process units. All require periodic reactivation of the catalyst. The initial sequence requires burning the coke from the catalyst followed by steps wherein agglomerated metal components are atomically redispersed. Major types of reforming include semi-regenerative, cyclic and semi-cyclic. In semi-regenerative reforming, the entire unit is operated by gradually and progressively increasing the temperature to maintain the activity of the catalyst, which is decreased by the coke deposition. The entire process unit is finally shutdown for regeneration, and reactivation, of the catalyst when the activity of the catalyst drops to a predetermined level.

Cyclic and serhi-cyclic reforming units consist of three or four reactor vessels in series, plus an additional "swing" reactor vessel. The swing reactor, by means of a valve manifold arrangement, can be placed on-stream in substitution for any one of the other reactors. This arrangement enables any one of the reactors to be removed from service and connected to a separate system of lines and valves for catalyst regeneration. After the catalyst has undergone coke burn-off and other desirable regeneration steps (for example, metals redispersion, reduction, sulfiding, etc.), the reactivated catalyst is returned to on-stream reforming service and another reactor is removed from service for catalyst regeneration. Cyclic reforming offers advantages in that the catalyst can be regenerated, and reactivated, without shutting down the unit. Moreover, because of this advantage, the unit can be operated at higher severities to produce higher $C_5+$ liquid yields than semi-regenerative reforming units. Unfortunately, "swinging" a regenerated reactor back on oil can be very disruptive to the unit. For example, reactor swings are typically characterized by a significant increase in total gas make and about 2 to 10 vol. % loss in recycle gas hydrogen purity. These transient effects, which may last for up to a day after the reactor swing, affects not only the operation of the reformer's furnace, reactor, and recycle gas sections, liquid stabilizing and gas handling systems, but also other process units found within the refinery. The sharp loss of hydrogen purity is a particularly drastic effect, causing disruptions to downstream hydroprocessing units which use hydrogen generated in the reformer. Also, reformer $C_5+$ liquid yield is depressed as a result of the increased fraction of naphtha feed which is cracked to $C_4-$ light gases.

One of the distinguishing differences between semi-regenerative reforming and cyclic reforming is that during catalyst regeneration in a semi-regenerative reforming unit, the hydrogen levels are typically greater than 20 vol. % and sometimes greater than 70 vol. %. Hydrogen levels are generally not higher than only 4 to 8 vol. % during cyclic catalyst regeneration until after catalyst regeneration is complete and the reactor is pressured up with hydrogen recycle gas when ready to "swing".

Attempts have been made in the past for shortening, or otherwise decreasing the severity of reforming unit restartup or swing upsets. For example, U.S. Pat. No. 3,507,781 teaches a start-up procedure wherein a naphtha feed is contacted with a catalyst (platinum/iridium on alumina) in the presence of an inert gas, such as nitrogen. The patent teaches that by use of such a procedure, the pressure in the reforming zone should be about 200 psig and the catalyst temperature about 343° C., when the feed is first contacted with the catalyst at a space velocity of about 1 volume/volume/hour. Thereafter, the temperature is increased to about 480° C. over a 2 to 3 hour period while building up autogenous pressure of produced hydrogen.

Another method is described in U.S. Pat. No. 4,148,758, wherein excessive hydrocracking or hydrogenolysis of a sulfur sensitive reforming catalyst is suppressed by incorporating within the reforming catalyst a sulfurous acid or sulfuric acid component.

Also, U.S. Pat. No. 4,261,810 teaches a start-up procedure of a reforming unit for preventing temperature runaways and over-cracking. The catalyst, during initial use or in a freshly-regenerated state, is contacted prior to contact with the chargestock, with a reformate characterized by an octane number (R+O) between about 90 and about 100. The reformate has an aromatics content within the range of 40 to 50 mole percent for a specified period of time at a temperature between about 315° C. and 400° C. The procedure taught in this '810 patent cannot be practiced in a conventional cyclic reforming unit in which reactor vessels are regenerated one at a time while the unit continues to maintain onstream production.

While various attempts have been made to mitigate the disruptions of reactor swings after regeneration of catalyst, there still remains a need in the art for improved procedures for accomplishing same.

SUMMARY OF THE INVENTION

In accordance with the present invention, there is provided an improved method for the regeneration of catalysts in a cyclic or semi-cyclic reforming process. The process comprises pre-treating the catalyst with an aromatic compound selected from single-ring aryl and arylalkyl compounds, wherein each alkyl group contains from 1 to 4 carbon atoms, in the presence of an effective amount of hydrogen, and at a temperature from about 300° to 540° C. for an effective amount of time.

In a preferred embodiment of the present invention, the aromatic compound is selected from toluene and xylene and the temperature of pretreatment is from about 370° to 510° C.

DETAILED DESCRIPTION OF THE INVENTION

Feedstocks which can be used in the practice of the present invention are any hydrocarbonaceous feedstocks boiling in the gasoline range. Non-limiting examples of such feedstocks include light hydrocarbon oils boiling from about 20° C. to about 260° C., preferably from about 80° C. to about 205° C. Such feedstocks include straight run naphtha; synthetically produced naphtha, such as a coal or oil-shale derived naphtha, thermally or catalytically cracked naphtha; hydrocracked naphtha; or blends and fractions thereof.

Catalysts suitable for use in the present invention include both monofunctional and bi-functional platinum-containing supported reforming catalysts, preferably multi-metallic platinum-containing catalysts. Also preferred are the bi-functional reforming catalysts comprised of a hydrogenation-dehydrogenation function and an acid function. The acid function, which is important for isomerization reactions, is thought to be associated with the carrier, or support, material. The support material will typically be an inorganic refractory oxide, preferably alumina. The hydrogenation-dehydrogenation function is generally attributed to a metal component, typically a Group VIII noble metal, such as platinum. Although it is preferred that the support be a refractory oxide, such as aluminas, it will be understood that the support material may also be a crystalline aluminosilicate, such as a zeolite. Non-limiting examples of zeolites which may be used herein include those having an effective pore diameter. By effective pore diameter we mean a pore diameter large enough to allow entry of up to $C_9$ molecules. Non-limiting of such zeolites include L-zeolite, zeolite X, and zeolite Y.

The Group VIII noble metal, preferably platinum, will be present on the catalysts of the present invention in an amount ranging from about 0.01 to 5 wt. %, more preferably from about 0.01 to 2 wt. %, and most preferably from about 0.1 to 0.7 wt. %, also calculated on an elemental metal basis on the final catalyst composition. Other platinum group metals suitable for use herein include palladium, iridium, rhodium, osmium, ruthenium, and mixtures thereof. One or more promoter metals selected from metals of Groups IIIA, IVA, IB, VIB and VIIB of the Periodic Table of the Elements may also be present. The promoter metal can be present in the form of an oxide, sulfide, or in the elemental state in an amount ranging from about 0.01 to about 5 wt. %, preferably from about 0.1 to 3 wt. %, and more preferably from about 0.2 to 3 wt. %, calculated on an elemental basis, and based on the total weight of the catalyst composition.

It is also preferred that the catalyst compositions have a relatively high surface area, for example, about 100 to 250 $m^2/g$. The Periodic Table of the Elements referred to herein is published by Sargent-Welch Scientific Company and having a copyright date of 1979 and available from Sargent-Welch as Catalog Number S-18806.

Reforming catalysts also usually contain a halide component which contributes to the necessary acid functionality of the catalyst. It is preferred that this halide component be chloride in an amount ranging from about 0.1 to 3.5 wt. %, preferably from about 0.5 to 1.5 wt. %, calculated on an elemental basis on the final catalyst composition.

As previously mentioned, catalyst regeneration and reactivation are conducted by taking a reactor off-line and replacing it with a swing reactor of a cyclic reforming process unit. Water, oxygen, hydrogen sulfide, and hydrogen chloride are typically used during regeneration. A detailed discussion of regeneration and reactivation of a reforming catalyst can be found in U.S. Pat. No. 4,769,128 which is incorporated herein by reference.

During regeneration of a coked deactivated catalyst, oxygen is typically introduced upstream of a regenerator furnace and into the reactor. In reactivation of the coke-depleted catalyst, oxygen, hydrogen chloride, and water, if needed, are injected into the reactor containing the catalyst to be reactivated, to redisperse agglomerated catalytic metal, or metals, components of the catalyst. Hydrogen sulfide is usually added to passivate the catalyst before it is contacted with feed.

In accordance with the present invention, the regenerated catalyst, prior to being brought back on stream, is treated in the presence of an effective amount of hydrogen, with an aromatic compound selected from single-ring aryl or single-ring arylalkyl compounds, wherein the alkyl group contains from 1 to 4 carbon atoms, preferably 1 to 3 carbon atoms, and more preferably 1 or 2 carbon atoms, and most preferably $CH_3$. Effective amounts of hydrogen, as used herein means at least about 1 vol. % hydrogen, preferably from about 1 to 10 vol. % hydrogen. The regenerated catalyst is treated with the aromatic compound, in the vapor phase, at a temperature from about 300° to about 540° C., preferably about 425° to 540° C., and more preferably from about 425° to 490° C. The amount of aromatic compound used will be from about 0.05 wt% to about 0.5 wt%, preferably from about 0.1 wt% to 0.3 wt%, based on the total weight of catalyst. Treating the regenerated catalyst with the aromatic compound will require less then one hour, typically less than one-half hour. It will be understood that the regenerated catalyst, when it is to be re-sulfided, can be treated with the aromatic hydrocarbon either before or after sulfiding.

Having thus described the preferred embodiments of the present invention, the following examples are present for illustration purposes and are not to be taken as limiting in any way.

EXAMPLE 1

0.8 grams of conventional Pt-Re reforming catalyst, designated KX-120 and manufactured by American Cyanamid and containing about 0.3 wt. % Pt and about 0.3 wt. % Re on an alumina support, in its reduced and sulfided state, were charged to a 1/2-inch-diameter stainless steel reactor for evaluation. The catalyst was heated to 500° C. under a pure hydrogen flow of 650 cc/min. After 30 minutes at 500° C., reagent-grade n-heptane feed was introduced at a liquid feed rate of 46.9 cc/hr. The resulting hot, vaporous reactor effluent was first sampled for gas chromatograph analysis ten minutes after the introduction of feed, with a second sample taken thirty minutes after the first. Analysis of the two effluent samples showed an average 47.4 wt. % conversion of heptanes to other hydrocarbon materials. Of the converted material, 26.8 wt. % was selectively converted to toluene, the desired heptane reforming product. The remaining 73.2 wt. % was converted to less desirable $C_1$-$C_6$ products. All heat-up and reaction steps were carried out at 200 psig reactor pressure.

EXAMPLE 2

A second test was conducted to examine the effects of pretreating the catalyst with a reformate of at least 40 mole percent aromatics content. A 0.8-gram sample of catalyst as used in Example 1 above was charged to a reactor and heated to 454° C., a temperature representative of the conditions at which a typical cyclic reforming unit reactor would complete the regeneration sequence prior to being swung back on oil, under flowing hydrogen, at the same 650 cc/min flow rate as in Example 1. After 30 minutes at 454° C., a 1.0 cc volume of light commercial reformate consisting of about 50 wt. % benzene and 50 wt. % paraffins was pulsed into the reactor. The catalyst was then heated to 500° C. and n-heptane was introduced at a liquid feed rate of 46.9 cc/hr. Analysis of the reactor effluent showed an average 28.8 wt. % product selectivity to toluene, although at a reduced catalyst activity of only 44.9 wt. % total heptanes conversion. As in Example 1, all steps were carried out at 200 psig.

EXAMPLE 3

A third test was conducted to examine the effects of pretreating the catalyst with a large quantity of pure benzene. This test was conducted according to the procedure of Example 2, except that a 1.0 cc volume (0.88 grams) of 100% benzene was employed. Average selectivity to toluene was found to have increased to 31.3 wt. %, at an even further reduced catalyst activity of only 43.6 wt. % total heptanes conversion.

EXAMPLE 4

Tests were carried out to determine if small quantities of vaporized aromatic hydrocarbon could be used to deposit low levels of carbon on catalyst, which would be expected to temper the disruptive effects of cyclic reactor swings. In the first test, 27.6 grams of commercially regenerated Pt-Re catalyst (KX-120) was heated to 482° C. in flowing 2 vol. % hydrogen in helium, at atmospheric pressure and a total ambient gas rate of 15 liters per hour. After one hour at this temperature, the catalyst was cooled to 454° C. for an additional 30 minutes prior to hydrocarbon addition, which was carried out by vaporizing benzene into the gas stream at a controlled liquid flow rate of 0.35 cc/hr. The total amount of benzene added was in excess of 1 percent catalyst, by weight, before stopping benzene addition, stopping the gas flow, allowing the catalyst to cool, and discharging the catalyst in three sections corresponding to roughly the first, second, and final thirds of the catalyst bed length. Analyses of these three sections showed that 0.07-0.09 wt. % carbon had been deposited on the catalyst. The second test was carried out in the same manner, with a catalyst charge of 36 grams, a gas flow of 19.5 liters per hour, and a benzene addition rate of 0.49 cc/hr. Hydrocarbon addition was stopped after less than 15 minutes, or a total amount of benzene equal to less than 0.30 weight percent of catalyst. Analyses showed 0.05-0.06 wt. % carbon to have been deposited on the catalyst.

EXAMPLE 5

A commercial cyclic reforming unit reactor containing 100,000 pounds of Pt-Re catalyst, off-line for catalyst regeneration and regenerated via normal procedures through catalyst reduction and at the point at which re-sulfiding would normally occur, was treated instead with a small amount of benzene. At a catalyst bed temperature of 460° C. in a recirculating atmosphere of 0.1 vol. % hydrogen, 30 liters of benzene were uniformly added over a 15-minute period, corresponding to 800-1200 vppm benzene at reactor inlet, for a total amount of benzene equal to only 0.06 wt. % of catalyst. Hydrogen concentration in the recirculating regeneration gas was observed to drop sharply to zero during the period of benzene addition. When swung back on oil, the reactor exhibited a 10° C. endothermic temperature drop, only half its normal 20° C. value, and within 4 hours this declined to zero, indicating little, if any, desirable reforming activity. The reactor was removed from service and regenerated again via normal, aromatic-free procedures.

EXAMPLE 6

Pilot plant tests were carried out at regeneration aromatics pretreatment conditions equivalent to those of Example 5 above, except that a constant 2 vol. % hydrogen atmosphere was maintained during the period of aromatics addition. In the first test, two cyclic reforming pilot plants, each consisting of four adiabatic reactors in series, with interstage reheaters and full recycle gas capabilities, were started up and operated in parallel, identical runs on conventional Pt-Re catalyst. Each unit also possessed an off-line "swing" reactor containing the same commercially regenerated Pt-Re catalyst (reduced, but not fully resulfided) employed in Example 4 above. In one unit, the off-line catalyst was re-sulfided at 455° C. and 2 vol. % hydrogen via normal procedure, using dilute hydrogen sulfide until H2S breakthrough was observed at the reactor outlet. In the other unit, the off-line catalyst was treated at 455° C. and 2 vol. % $H_2$, with 0.16 wt. % benzene. In each of the parallel, identical pilot plant runs, the off-line reactor was placed into service in the third reactor position. The conventionally resulfided catalyst exhibited as 15° C. improvement (increase) in endothermic temperature drop over the partially deactivated catalyst bed it replaced. The catalyst which had been treated with 0.16 wt. % benzene also exhibited a 15° C. improvement over the partially deactivated bed it replaced, and maintained performance, as indicated by endothermic temperature drop for the next several days prior to test shutdown, equal to that of the resulfided catalyst.

In the second test, two new identical, parallel runs were carried out in the same cyclic reforming pilot plants. In the two off-line reactors containing new charges of the commercially used catalyst, one was resulfided the same as the first test, while the other was treated with 0.20 wt. % methylbenzene, or toluene. In this second test, the off-line reactors were returned to service in the first reactor position. Once again the two reactors exhibited equivalent performance. In neither of these two tests did the catalyst treated with aromatic hydrocarbon display the disastrous on-stream performance encountered in Example 5.

EXAMPLE 7

A commercial cyclic reforming reactor containing 23,500 pounds of Pt-Re catalyst of the same type used in the above examples, off-line and regenerated vial normal procedures through catalyst reduction to the point at which resulfiding would normally be done, was treated with 23 pounds of toluene, equal to 0.10 wt% of catalyst, added evenly over an 8-minute period, equal to 1000 vppm benzene at reactor inlet, with the catalyst bed at 443° C. in a recirculating atmosphere of 2 vol. % hydrogen. Upon completion of toluene addition, the reactor was returned to its usual on-stream, second-reactor position. The sheer size of commercial reforming units and the large volumes of recycle and make gas flows which must be metered and/or compressed tend to make the commercial units somewhat more sensitive than pilot plants to the upsets, disruptions, and transient effects of cyclic reactor swings, although precise measurements are more difficult because of the complexities and constantly changing parameters of commercial unit operation. Nevertheless, returning the toluene-treated reactor to on-stream service was found to result in a smaller, less drastic transient upset in unit bed temperature profiles. Temperatures lined out at levels equal to those normally achieved, and the test reactor remained on stream, with a level of performance normally maintained between scheduled regeneration, without having to be removed early. The next regeneration of this reactor was carried out 15 days after the one described above. The catalyst was again treated with 0.10 wt. % toluene in the same manner, but with the catalyst bed at 480° C. The less drastic transient upsets of the first toluene test swing allowed the second test to be conducted at this higher temperature, thereby enabling the regenerated reactor to be swung into on-stream position and brought up to full, normal operating temperature in less time. Once again, favorable reactor swing and on-stream performance results were obtained.

What is claimed is:

1. In a process for catalytically reforming a gasoline boiling range hydrocarbonaceous feedstock in the presence of hydrogen in a reforming process unit comprised of a plurality of serially-connected reactors, including a swing reactor, wherein each of the reactors contains a supported Group VIII noble metal-containing reforming catalyst and wherein the swing reactor is used to replace a reactor which is brought off-stream for catalyst regeneration, the improvement which comprises treating said regenerated catalyst with an effective amount of hydrogen and an effective amount of one or more aromatic compounds at a temperature from about 300° C. to 540° C. prior to the catalyst being brought back on stream, said aromatic compounds are selected from single-ring aryl or single-ring arylalkyl compounds, wherein said alkyl group contains from about 1 to 4 carbon atoms.

2. The process of claim 1 wherein the catalyst is comprised of from about 0.01 to 5 wt. % platinum on an alumina support.

3. The process of claim 1 wherein the catalyst is comprised of about 0.01 to 2 wt. % platinum on an alumina support.

4. The process of claim 2 wherein the catalyst also contains from about 0.2 to 3 wt. % of a promoter metal.

5. The process of claim 2 wherein the catalyst is comprised of platinum, a halide, and at least one other metal selected from Group VIII noble metals, Groups IIIA, IVA, IB, VIB, and VIIB, and alumina.

6. The process of claim 1 wherein the alkyl group is from 1 to 3 carbon atoms.

7. The process of claim 6 wherein the alkyl group is 1 or 2 carbon atoms.

8. The process of claim 1 wherein the catalyst is comprised of platinum, a halide, and at least one other metal selected from iridium, rhenium, and copper; and the aromatic compound is toluene.

9. The process of claim 1 wherein at least about 1 vol. % of hydrogen is present during treatment of the regenerated catalyst with the aromatic compound(s).

10. The process of claim 7 wherein about 1 to 10 vol. % hydrogen is present during treatment of the regenerated catalyst with the aromatic compound(s).

* * * * *